United States Patent Office 3,390,122
Patented June 25, 1968

3,390,122
HYDROCARBON-SULFONIC ACID LATENT CATALYSTS FOR THERMOSETTING COMPOSITIONS
Robert Louis Heppolette, Toronto, Ontario, James David Murdock, St. Hilaire, Quebec, and Mirko Ternbah, McMasterville, Quebec, Canada, assignors to Canadian Industries Limited, Montreal, Quebec, Canada, a corporation of Canada
No Drawing. Filed Apr. 12, 1965, Ser. No. 447,537
Claims priority, application Canada, Apr. 25, 1964, 901,300
13 Claims. (Cl. 260—40)

ABSTRACT OF THE DISCLOSURE

Hydrocarbon-sulphonic esters of primary alcohols and alkali metal salts of alkyl sulphuric and hydrocarbon-sulphonic acids are used as latent catalysts in thermosetting compositions comprising compounds containing at least two dihydropyranyl groups per molecule and compatible polyhydroxyl compounds reactive therewith.

This invention relates to improved substantially solvent-free compositions that harden when heated in the presence of an acidic catalyst to form tough, solvent-resistant cross-linked polymers. More particularly, this invention relates to improved substantially solvent-free thermosetting compositions containing a latent acidic catalyst.

Substantially solvent-free liquid polymer-forming compositions comprising compounds containing at least two dihydropyranyl groups per molecule and a polyhydroxyl compound reactive therewith in admixture with an acidic catalyst have already been described. Although such polymer-forming compositions have many advantages, their utilization requires that the acidic catalyst be added to the composition shortly before use. This necessitates the packaging of the catalyst ingredient separately from the reactive ingredients. It is, however, commercially desirable to provide a one-package system which is stable on storage, thus reducing inventory problems and avoiding the possibility of employing the composition without the catalyst.

It has now been found that certain latent acid catalysts can be used to provide improved substantially solvent-free compositions which may be converted by heating under the influence of an acidic catalyst from liquid into solid thermoset polymers. These products include liquid compositions which yield excellent protective coating films and which may be applied to substrates in the virtual absence of solvent. The compositions may also be used to impregnate pieces of reinforcing material, for example glass fibre.

The improved compositions of this invention comprise a mixture of from 5 to 88% by weight of a compound containing at least two dihydropyranyl groups per molecule, from 93% to 10% by weight of a compatible polyhydroxyl compound reactive therewith, and from 0.002% to 2% by weight of a latent acidic catalyst having long term stability in the composition at room temperature, the percentage weights being calculated on the combined weight of the polyhydroxyl and dihydropyranyl ingredients and catalyst.

The reaction of the ingredients of these improved compositions yields solid thermoset polymers. Optionally, but not desirably, a solvent for the ingredients may be present in the compositions. Fillers may also be present, serving for example as pigments, lubricants and mechanical reinforcements. Reinforced composite materials may thus be obtained using the ingredients and catalysts of the invention to give a cross-linked resin component.

The compounds of this invention containing at least two dihydropyranyl groups per molecule may be represented by the generic formula

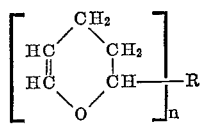

where $n$ is an integer with value of at least 2 and R is a linking radical of valency equivalent to $n$. Compounds of this general type are known and have been disclosed, for example, in United States patent specifications 2,479,283 and 2,514,168 and in British patent specification 653,764.

The dihydropyranyl rings in the above formula may of course have non-interfering substituents replacing the hydrogen atoms on each carbon of the rings. By "non-interfering substituents" are meant those substituents which have neither acid nor basic functions. Methods for preparing substituted dihydropyranyl compounds are disclosed in United States patent specification 2,537,921.

A particularly suitable dihydropyranyl group-containing compound for use in the compositions of this invention is 3,4-dihydro-2H-pyran-2-methyl 3,4-dihydro-2H-pyran-2-carboxylate or "acrolein tetramer." It may be prepared by the self condensation of acrolein dimer (2-formyl-3,4-dihydro-2H-pyran) in the presence of about 0.3% of aluminium isopropoxide, the reaction temperature being held at 45° C. for 6 hours. A purified product is obtained by flash distillation in a falling film still at 150° C. under vacuum. 3,4-dihydro-2H-pyran-2-methyl 3,4-dihydro-2H-pyran-2-carboxylate has been found to be compatible with many polyhydroxyl compounds, and under acid catalysis yields an acetone-insoluble thermoset cross-linked polymer when reacted with those compatible hydroxyl compounds which contain two or more hydroxyl groups.

A suitable baking condition is 120° C. for 30 minutes. Too high a baking temperature will cause excessive evaporation of the dihydropyranyl group-containing ingredient.

Examples of other suitable dihydropyranyl compounds are 1,2-bis(3',4'-dihydro-2'H-pyran-2'-carbonyloxy)ethane,
bis-(3,4-dihydro-2H-pyran-2-methyl) succinate,
1,2-bis(3',4'-dihydro-2'H-pyran-2'-oxy)ethane,
1,1-bis(3',4'dihydro-2'H-pyran-2'-methoxy)ethane,
1,2-bis(3'4'-dihydro-2',5'-dimethyl-2'H-pyran-2'-carbonyloxy)ethane,
1,2-bis(3'4'-dihydro-5'-methyl-2'H-pyran-2'-oxy)ethane,
1,1-bis-(3',4'dihydro-2',5'dimethyl-2'H-pyran-2'-methoxy)ethane,
2,4-bis-(3',4'-dihydro-2'H-pyran-2'methoxycarbonamido) toluene,
(3,4-dihydro-2-formyl-2H-pyran-2)-(3,4-dihydro-2H-pyran-2)methanol, the triester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids.

The polyhydroxyl ingredients of the compositions of this invention must contain at least two hydroxyl groups in their molecule, although it is of course permissible to use a monohydroxy compound as a diluent or modifier. In addition, the polyhydroxyl compounds must be compatible with, i.e. miscible with or soluble in, the dihydropyranyl group-containing components. Thus the two components must be either miscible liquids, or one of them can be a solid soluble in the other; alternatively, they both may be solids and can be used as a solution in a mutual solvent, but in this case no use is made of an advantageous feature of the invention. The hydroxyl groups (—OH) herein referred to include alcoholic, phenolic and carboxylic hydroxyl groups. It is of course possible that the polyhydroxyl compounds contain other reactive groups.

Among the wide range of polyhydroxyl compounds suitable for use in the compositions of this invention, there may be mentioned the following groups.

(1) Polyether condensates of polyhydric alcohols and olefine oxides, such as the condensates of glycerol and propylene or ethylene oxides.

(2) Hydroxy-containing esters and polyesters, being condensates of polyhydric alcohols and polybasic acids. Proportions may range from one mole of polyol for each carboxylic acid group in the acid, to one mole of polycarboxylic acid for each hydroxyl group in the polyol. The first limit gives an ester containing free alcoholic —OH groups whereas the second gives an ester containing carboxylic acid groups. In between the limits polyesters are formed. Examples are one mole of glycol for one mole of butanoic acid, three moles of glycol for one mole of trimellitic anhydride, one mole of glycerol for three moles of maleic anhydride, three moles of 1,2,6-hexane-triol for two moles of phthalic anhydride, or one mole of glycerol for one mole of adipic acid. This group includes alkyd resins, oil-modified or not, having an hydroxyl number of at least 50.

(3) Styrene-allyl alcohol copolymers containing at least 5% by weight of allyl alcohol.

(4) Epoxide-acid adducts known as epoxy esters.

(5) Phenolic resins such as the known phenol-formaldehyde condensates, particularly novolak resins.

(6) 2,2-di-p-hydroxyphenylpropane.

(7) Copolymers prepared from at least 5% of an hydroxyl-containing monomer such as acrylic or methacrylic acid, β-hydroxyethyl methacrylate or N-methylol acrylamide, the remainder of the copolymers being composed of ethylenically unsaturated monomers copolymerisable with the hydroxyl-containing monomer. Such copolymers are now well known, being disclosed for example in United States patent specifications 2,681,897 and 2,964,492. In addition, the hydroxyl groups may be inserted into a preformed copolymer, as disclosed in United States patent specification 2,940,945 and British patent specification 771,569.

Monomeric polyols such as glycol and glycerol are often incompatible with compounds containing at least two dihydropyranyl groups per molecule, but by condensing one mole of the dihydropyranyl compound with two moles of such polyols as glycol, glycerol, 1,5-pentanediol, or 1,2,6-hexanetriol, a polyhydroxy compound results which is compatible and useful in the compositions of the present invention. Polycarboxylic acids such as adipic, azelaic and trimellitic also become compatible with the dihydropyranyl ingredients through reaction.

The latent acidic catalysts suitable for promoting the cross-linking reaction between the compound containing at least two dihydropyranyl groups per molecule and the polyhydroxyl compound must, when dispersed or dissolved in the composition, be stable at room temperature but must liberate free acid when heated to the curing temperature. It has been found that the effectiveness of the catalysts depends upon the nature of the radical linked to the reactive acidic group. For example, dimethyl sulphate and diethyl sulphate, when employed as latent catalysts in the compositions of this invention, liberate free acid so readily at room temperature that within about an hour after incorporation the composition has gelled. It is believed that the size and configuration of the radical linked to the reactive acidic group is critical with regard to the effectiveness of the latent catalyst.

A group of catalysts with suitable properties of latent activity are the hydrocarbon-sulphonic esters of primary, preferably straight chain, alcohols having from 4 to 14 carbon atoms. Examples of such compounds are the sulphonic esters of 1-butanol, 2-methyl-1-propanol, 2-methyl-2-nitro-1-propanol, 1-hexanol, 1-heptanol, 1-octanol, 1-decanol, 1-undecanol and 1-tetradecanol. The most active latent catalysts within this group include the p-toluenesulphonic and methanesulphonic esters of the above alcohols, particularly n-octyl p-toluenesulphonate, n-decyl p-toluenesulphonate, n-tetradecyl p-toluenesulphonate, β-nitroisobutyl p-toluenesulphonate, n-undecyl methanesulphonate, and n-tetradecyl methanesulphonate.

Another group of compounds suitable as latent catalysts in the compositions of this invention are the alkali metal salts of alkyl sulphuric and hydrocarbon-sulphonic acids, for example ethyl sulphuric acid, 2-propanesulphonic acid and p-xylenesulphonic acid. Sodium or potassium salts are generally convenient.

Suitable catalytic amounts range from 0.002% to 2.0% by weight, calculated on the combined weight of the polyhydroxyl and dihydropyranyl ingredients and catalyst.

The amount of the polyhydroxyl compound in the liquid compositions of this invention should be at least 10% by weight of the total, in order that a strong solid product be obtained after polymerisation in the presence of the acidic catalyst. However, when the dihydropyranyl group-containing ingredient is present in large amounts, such that there are two or more dihydropyranyl groups for each hydroxyl group, it has been found that the polymerisation is sometimes air-inhibited. In this case, the surface of the polymerising mixture must be shielded from air by known methods such as covering with polyethylene or polyester film. It is preferred that coating compositions of this invention should not be air-inhibited, but for casting, impregnating and moulding the compositions of this invention may be prepared over the whole composition range.

The minimum effective amount of the dihydropyranyl group-containing ingredient of the compositions of this invention depends upon the functionality of the polyhydroxyl ingredient. When the functionality of the latter is low, as in certain hydroxyl-containing vinyl or acrylic copolymers, then substantially a full equivalent of the dihydropyranyl group-containing ingredient should be used. When the polyhydroxyl ingredient functionality is higher, less than a full equivalent of the dihydropyranyl group-containing ingredient may be used, but in all cases at least 5% by weight of the dihydropyranyl group-containing ingredient should be present, calculated on the combined weight of the polyhydroxyl and dihydropyranyl ingredients and catalyst.

The invention is additionally illustrated by the following examples in which parts and percentages are by weight.

Example 1

A series of compositions was prepared containing different catalysts admixed with a 1:1 blend of polyester resin and 3,4-dihydro-2H-pyran-2-methyl 3,4-dihydro-2H-pyran-2-carboxylate dissolved in 5% methyl ethyl ketone. The polyester resin was prepared by the condensation of maleic anhydride (294 g., 3 moles), dipropylene glycol (402 g., 3 moles) and trimethylolethane (360 g., 3 moles) dissolved in toluene (150 cm.³). The toluene was distilled off after completion of the reaction. The catalysts were dissolved in a common solvent and added to the blend in proportions of 0.2 part per hundred parts. The activity of the catalyst was determined periodically by measurement of the viscosity of the blend. The composition was stored at room temperature. The results of different catalysts are shown in Table I, where the stability of the composition is indicated by the time to reach a viscosity of 3 poises.

TABLE I

| Catalyst | Catalyst solvent | Stability |
|---|---|---|
| Methyl p-toluenesulphonate | Methanol | Gelled in less than 30 min. |
| Ethyl p-toluenesulphonate | do | Gelled in less than 3 hours. |
| Isopropyl p-toluenesulphonate | do | Gelled in less than 30 min. |
| s-Butyl p-toluenesulphonate | do | Do. |
| t-Butyl p-toluenesulphonate | do | Do. |
| n-Butyl p-toluenesulphonate | Butanol | Greater than 10 weeks. |
| Isobutyl p-toluenesulphonate | Methanol | Do. |
| β-Nitroisobytyl p-toluenesulphonate | Methyl ethyl ketone | Greater than 4 weeks. |
| n-Butyl mehtanesulphonate | Butanol | Greater than 10 weeks. |
| 1,1-dimethylpropyl p-toluenesulphonate | Methanol | Gelled in less than 30 min. |
| 1,2-dimethylpropyl p-toluenesulphonate | do | Do. |
| Cyclohexyl p-toluenesulphonate | do | Gelled in less than 24 hours. |
| n-Hexyl p-toluenesulphonate | Methyl ethyl ketone | Greater than 16 weeks. |
| n-Heptyl p-toluenesulphonate | do | Do |
| n-Octyl p-toluenesulphonate | Methanol | 10 weeks. |
| n-Decyl p-toluenesulphonate | do | Do. |
| n-Decyl methanesulphonate | do | Do. |
| n-Undecyl p-toluenesulphonate | do | 3 weeks. |
| n-Undecyl methanesulphonate | do | 4 weeks. |
| n-Tetradecyl p-toluenesulphonate | do | 3 weeks. |
| n-Tetradecyl methanesulphonate | do | Do. |
| Ethyl sulphuric acid potassium salt | Dimethyl formamide | 4 weeks. |
| 2-propane sulphonic acid sodium salt | Methanol | Greater than 24 weeks. |

Example 2

A number of the catalysts of Example 1 were employed in pigmented formulations and the quality of the resulting coatings was tested. The composition consisted of a 1:1 blend of the polyester resin of Example 1 and 3,4 - dihydro - 2H - pyran - 2 - methyl 3,4 - dihydro - 2H-pyran-2-carboxylate dissolved in 5% methyl ethyl ketone. Rutile titanium dioxide in proportion of one half of the blend by weight was then added as pigment. Several latent catalysts were added to separate portions of this coating composition, the coating compositions so made being drawn down on steel panels and then baked to thermoset the resin. The resulting coatings were then tested as shown in Table II. For testing solvent resistance, acetone was used. The blend test was a simple 180° blend of the panel over a sharp edge. The flexibility was measured by a bump test employing the impact of a hemisphere of diameter 16 mm. with energy $4.1 \times 10^7$ dynes cm. The results were rated on a scale of 1 to 5, 5 being best and 1 the worst.

TABLE III

| Elapsed Time (Days): | Catalyst | |
|---|---|---|
| | 0.5% | 1.0% |
| 0 | 540 | 256 |
| 3 | 590 | 270 |
| 6 | 560 | 246 |
| 8 | 600 | 280 |
| 10 | 560 | 255 |
| 13 | 640 | 280 |
| 17 | 640 | 280 |
| 24 | 620 | 280 |
| 41 | 750 | 300 |
| 57 | 840 | 340 |
| 78 | 860 | 340 |
| 97 | 960 | 380 |
| 141 | 1,120 | 440 |

We claim:

1. A thermosetting composition comprising from 5% to 88% by weight of a compound containing at least two dihydropyranyl groups per molecule, from 93% to 10% by weight of a compatible polyhydroxyl compound reactive therewith selected from the group consisting of

TABLE II

| Catalyst | Percent | Curing | | Solvent resistance | Toughness (coin) | Flexibility Bump Test | | 180° Bend | Gloss |
|---|---|---|---|---|---|---|---|---|---|
| | | Min. | °C. | | | In | Out | | |
| Ethyl sulphuric acid potassium salt | 0.5 | 30 | 150 | 4 | 3 | 4 | 3 | 5 | Good. |
| | 1.0 | 30 | 150 | 4+ | 3+ | 5 | 4 | 5 | Dull. |
| Undecyl p-toluenesulphonate | 0.5 | 45 | 120 | 4 | 3 | 4 | 4 | 5 | Fair. |
| | | 30 | 150 | 4+ | 3 | 4 | 4 | 5 | Do. |
| | 1.0 | 45 | 120 | 4 | 3 | 4 | 3 | 4 | Good. |
| | | 30 | 150 | 4+ | 4 | 4 | ⅔ | 5 | Do. |
| Undecyl methanesulphonate | 0.5 | 30 | 150 | 4 | 4 | 4 | 4 | 5 | Do. |
| Tetradecyl p-toluenesulphonate | 0.5 | 45 | 120 | 4 | 3 | 4 | 3 | 5 | Do. |
| | | 30 | 150 | 4+ | 3 | 4 | 4 | 5 | Do. |
| | 1.0 | 45 | 120 | 4+ | 4 | 4 | 3 | 4 | Do. |
| | | 30 | 150 | 4+ | 4 | 4 | 3 | 4 | Poor. |
| Tetradecyl methanesulphonate | 0.5 | 30 | 150 | 4+ | 3 | 4 | 4 | 5 | Fair. |
| | 1.0 | 30 | 150 | 4 | 3+ | 4 | 4 | 5 | Do. |
| p-Xylenesulphonic acid sodium salt | 1.0 | 30 | 150 | 4 | 3+ | 4 | 3 | 4 | Do. |

Example 3

The sodium salt of p-xylenesulphonic acid was employed as catalyst in the pigmented composition of Example 2 in proportions of 0.5% and 1.0% of the composition. The viscosities of the catalyst-containing coating compositions were measured with a Brookfield viscometer over a period of 141 days. The compositions were stored at room temperature. It can be seen from Table III that the compositions have a useful shelf life; the viscosities of the compositions are given in centipoises at elapsed time in days.

(1) Polyether condensates of polyhydric alcohols and olefin oxides,
(2) Hydroxy-containing esters and polyesters which are condensates of polyhydric alcohols and polybasic acids,
(3) Styrene-allyl alcohol copolymers containing at least 5% weight of allyl alcohol,
(4) Epoxide-acid adducts known as epoxy esters,
(5) Phenolic resins,
(6) 2,2-di-p-hydroxyphenylpropane,
(7) Copolymers prepared from monomeric mixtures containing at least 5% of an hydroxyl-containing monomer with an ethylenically unsaturated monomer, and from 0.002% to 2.0% by weight of a latent acidic catalyst capable of liberating free acid when heated to the curing temperature for said composition but not at room temperature, and selected from the class consisting of the hydrocarbon-sulphonic esters of primary alcohols having from 4 to 14 carbon atoms in the molecule and the alkali metal salts of alkyl sulphuric and hydrocarbon-sulphonic acids, the percentage weights being calculated on the combined weight of the polyhydroxyl and dihydropyranyl ingredients and catalyst.

2. A thermosetting composition as claimed in claim 1 wherein the catalyst is an alkali metal salt of ethyl sulphuric acid.

3. A thermosetting composition as claimed in claim 1 wherein the catalyst is an alkali metal salt of 2-propanesulphonic acid.

4. A thermosetting composition as claimed in claim 1 wherein the catalyst is an alkali metal salt of p-xylenesulphonic acid.

5. A thermosetting composition as claimed in claim 1 wherein the catalyst is a p-toluenesulphonic ester of a primary straight-chain alcohol having from 4 to 14 carbon atoms.

6. A thermosetting composition as claimed in claim 1 wherein the catalyst is a methanesulphonic ester of a primary straight-chain alcohol having from 4 to 14 carbon atoms.

7. A thermosetting composition as claimed in claim 1 wherein the dihydropyranyl group-containing compound is 3,4-dihydro-2H-pyran-2-methyl 3,4-dihydro-2H-pyran-2-carboxylate.

8. A thermosetting composition as claimed in claim 1 wherein the polyhydroxyl compound is the hydroxyl-containing polyester formed by the condensation of maleic anhydride with dipropylene glycol and trimethylolethane.

9. A thermosetting composition as claimed in claim 1 wherein the polyhydroxyl compound is a phenol-formaldehyde condensate.

10. A thermosetting composition comprising from 5% to 88% by weight of 3,4-dihydro-2H-pyran-2-carboxylate, from 93% to 10% by weight of a novolak resin, and from 0.002% to 2.0% by weight of a latent acid catalyst capable of liberating free acid when heated to the curing temperature for said composition but not at room temperature, and selected from the class consisting of the hydrocarbon-sulphonic esters of primary alcohols having from 4 to 14 carbon atoms in the molecule and the alkali metal salts of alkyl sulphuric and hydrocarbon-sulphonic acids, the percentage weights being calculated on the combined weight of the novolak resin, the 3,4-dihydro-2H-pyran-2-methyl 3,4-dihydro-2H-pyran-2-carboxylate, and the catalyst.

11. A liquid thermosetting composition comprising from 5% to 88% by weight of a compound containing at least two dihydropyranyl groups per molecule, from 93% to 10% by weight of a compatible polyhydroxyl compound reactive therewith selected from the group consisting of (1) Polyether condensates of polyhydric alcohols and olefin oxides,
(2) Hydroxy-containing esters and polyesters which are condensates of polyhydric alcohols and polybasic acids,
(3) Styrene-allyl alcohol copolymers containing at least 5% by weight of allyl alcohol,
(4) Epoxide-acid adducts known as epoxy esters,
(5) Phenolic resins,
(6) 2,2-di-p-hydroxyphenylpropane,
(7) Copolymers prepared from monomeric mixtures containing at least 5% of an hydroxyl-containing monomer with an ethylenically unsaturated monomer, and from 0.002% to 2.0% by weight of a latent acidic catalyst capable of liberating free acid when heated to the curing temperature for said composition but not at room temperature, and selected from the class consisting of the hydrocarbon-sulphonic esters of primary alcohols having from 4 to 14 carbon atoms in the molecule and the alkali metal salts of alkyl sulphuric and hydrocarbon-sulphonic acids, the percentage weights being calculated on the combined weight of the polyhydroxyl and dihydropyranyl ingredients and catalyst.

12. A thermosetting composition as claimed in claim 1, which comprises glass-fibre reinforcing material.

13. A thermosetting composition as claimed in claim 10, which comprises glass-fibre reinforcing material.

References Cited
UNITED STATES PATENTS

| | | | |
|---|---|---|---|
| 3,317,474 | 5/1967 | Jones | 260—57 |
| 2,537,921 | 1/1951 | Smith | 260—86.1 |
| 3,311,575 | 3/1967 | Graham | 260—2.5 |

MORRIS LIEBMAN, *Primary Examiner.*

R. BARON, *Assistant Examiner.*